United States Patent
Duer et al.

(10) Patent No.: US 9,767,065 B2
(45) Date of Patent: Sep. 19, 2017

(54) DYNAMIC VEHICLE BUS SUBSCRIPTION

(71) Applicant: GM Global Technology Operations LLC, Detroit, MI (US)

(72) Inventors: Armando A. Duer, West Bloomfield, MI (US); Carl J. Hering, Farmington Hills, MI (US); Craig A. Lambert, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/464,854

(22) Filed: Aug. 21, 2014

(65) Prior Publication Data
US 2016/0055116 A1    Feb. 25, 2016

(51) Int. Cl.
G05D 1/00 (2006.01)
G06F 13/42 (2006.01)
H04W 4/00 (2009.01)

(52) U.S. Cl.
CPC ........ G06F 13/4221 (2013.01); H04W 4/008 (2013.01)

(58) Field of Classification Search
USPC .................................................. 701/36–124
See application file for complete search history.

(56) References Cited

U.S. PATENT DOCUMENTS

| | | | | |
|---|---|---|---|---|
| 5,661,807 A * | 8/1997 | Guski | ................... | H04L 9/3228 340/5.26 |
| 6,983,381 B2 * | 1/2006 | Jerdonek | ............... | H04L 9/3271 726/5 |
| 8,132,243 B2 * | 3/2012 | Bychkov | ................. | G06F 21/31 455/418 |
| 8,255,696 B2 * | 8/2012 | Florencio | ................ | G06F 21/46 705/64 |
| 8,705,527 B1 * | 4/2014 | Addepalli | ............. | H04W 4/046 370/389 |
| 8,898,749 B2 * | 11/2014 | Tohmo | ................... | H04L 9/0863 713/182 |
| 2007/0250290 A1 * | 10/2007 | Kurosawa | ........... | G03F 7/70725 702/150 |
| 2009/0178144 A1 * | 7/2009 | Redlich | ............... | G06F 21/6209 726/27 |
| 2009/0254572 A1 * | 10/2009 | Redlich | .................. | G06Q 10/06 |
| 2010/0262835 A1 * | 10/2010 | Joffray | .................... | G06F 21/34 713/185 |
| 2010/0271509 A1 * | 10/2010 | Marumoto | ............. | H04N 5/765 348/231.99 |
| 2011/0040944 A1 * | 2/2011 | Yamauchi | ............... | G06F 21/45 711/163 |

(Continued)

*Primary Examiner* — Hussein A. Elchanti
(74) *Attorney, Agent, or Firm* — Christopher DeVries; Reising Ethington P.C.

(57) ABSTRACT

A method of controlling access at a vehicle to information communicated over a vehicle bus includes: storing one or more electronic control unit (ECU) identities in a central gateway module (CGM) that is communicatively linked with a vehicle bus; associating one or more message permissions for receiving messages via the vehicle bus with one of the ECU identities in the CGM that represents an ECU communicatively linked with the vehicle bus; wirelessly receiving a computer-readable instruction at the vehicle directing the CGM to change one or more message permissions associated with the ECU identity; and storing the changed message permissions in the CGM.

11 Claims, 2 Drawing Sheets

(56) References Cited

U.S. PATENT DOCUMENTS

| | | | |
|---|---|---|---|
| 2011/0055481 A1* | 3/2011 | Murakami | G06F 12/0875 711/118 |
| 2012/0185398 A1* | 7/2012 | Weis | G06Q 20/20 705/75 |
| 2013/0104251 A1* | 4/2013 | Moore | G06F 21/602 726/30 |
| 2013/0124669 A1* | 5/2013 | Anderson | G06F 11/3006 709/217 |
| 2014/0277917 A1* | 9/2014 | Banet | G07C 5/00 701/31.5 |
| 2014/0282978 A1* | 9/2014 | Lerner | H04L 63/083 726/7 |
| 2015/0026372 A1* | 1/2015 | Laichinger | G06F 13/4004 710/105 |

\* cited by examiner

DYNAMIC VEHICLE BUS SUBSCRIPTION

TECHNICAL FIELD

The present invention relates to electronic control units (ECUs) in a vehicle and, more particularly, to dynamically controlling access at a vehicle to information communicated over a vehicle bus and received by the ECUs.

BACKGROUND

Electronic control units (ECUs) are used at a vehicle to carry out a number of vehicle functions. ECUs include microprocessors, memory devices, and peripherals and/or microcontrollers that can be programmed to carry out specific tasks at the vehicle, such as monitoring vehicle performance or controlling vehicle operation. For example, the vehicle can use ECUs at vehicle systems modules (VSMs) that are each dedicated to one or more vehicle functions. A body control module is one type of VSM that can control vehicle functions, such as door locking/unlocking, window opening/closing, or HVAC systems of the vehicle.

The ECUs—as well as other vehicle electronics—can communicate with each other over a communications bus (also called a vehicle bus) in a vehicle. The ECUs can receive instructions or messages over the vehicle bus. For instance, the body control module discussed above can receive messages via the vehicle bus to lock or unlock vehicle doors. However, in order to process these instructions each ECU may first be granted permission to do so. The vehicle can maintain a database that includes an ECU identity representing each ECU in the vehicle and the messages that the ECU is authorized to receive. The database can permit or deny the ability of the ECU to process messages received over the vehicle bus. The database is usually stored at the vehicle when the vehicle is manufactured. Therefore, the permissions attributed to each ECU may be fixed at that time without providing an mechanism to change those permissions. However, it may be helpful if the permissions could be changed after the vehicle has been manufactured.

SUMMARY

According to an embodiment of the invention, there is provided a method of dynamically controlling access at a vehicle to information communicated over a vehicle bus. The method includes storing one or more electronic control unit (ECU) identities in a central gateway module (CGM) that is communicatively linked with a vehicle bus; associating one or more message permissions for receiving messages via the vehicle bus with one of the ECU identities in the CGM that represents an ECU communicatively linked with the vehicle bus; wirelessly receiving a computer-readable instruction at the vehicle directing the CGM to change one or more message permissions associated with the ECU identity; and storing the changed message permissions in the CGM.

According to another embodiment of the invention, there is provided a method of dynamically controlling access at a vehicle to information communicated over a vehicle bus. The method includes wirelessly receiving from a central facility a computer-readable instruction to change one or more message permissions associated with an electronic control unit (ECU) identity stored at the vehicle in a central gateway module (CGM) that is communicatively linked with a vehicle bus; changing the message permissions at the CGM in response to the computer-readable instruction; sending the changed message permissions over the vehicle bus from the CGM to an ECU represented by the ECU identity; determining at the ECU whether it has permission to process messages received over the vehicle bus; and processing or ignoring the messages based on the changed permissions associated with the ECU identity.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below dynamically control access at a vehicle to information communicated over a vehicle bus. A central gateway module (CGM) can be communicatively connected to one or more vehicle busses and store a number of ECU identities as well as message permissions associated with each ECU identity. Each ECU on a vehicle can be associated with an ECU identity, which can include one or more message permissions that allow the ECU to receive a subset or class of messages transmitted over the vehicle bus. The CGM can maintain individual ECU identities and associated message permissions in non-volatile memory at the vehicle. The CGM can also be communicatively linked with a vehicle telematics unit so that certain aspects of the message permissions maintained in the CGM with each ECU identity can be changed individually without replacing an entire database of ECU identities and the permissions associated with those ECU identities. In the past, changing even one aspect of the message permissions included in a database would involve replacing the entire database of ECU identities and message permissions. However, in the system/method described herein the CGM can receive an instruction to change one or more message permissions associated with an ECU identity without replacing an entire database of ECU identities and permissions.

The vehicle telematics unit can receive an instruction that is wirelessly transmitted from a remote facility directing the CGM to change one or more message permissions associated with one or more ECU identities. The instruction can also include temporal limits on the message permissions to be changed. For example, one ECU identity could receive permission to receive messages relating to the locking or unlocking of doors for some defined period of time, such as an hour. After the period of time passes, the permissions associated with that ECU identity can return to their original settings. The ability of the CGM to receive changes to the message permissions associated with individual ECU identities can allow the ECUs to receive messages as needed without the expense and effort involved with replacing an entire database of ECU identities.

Figure 1:
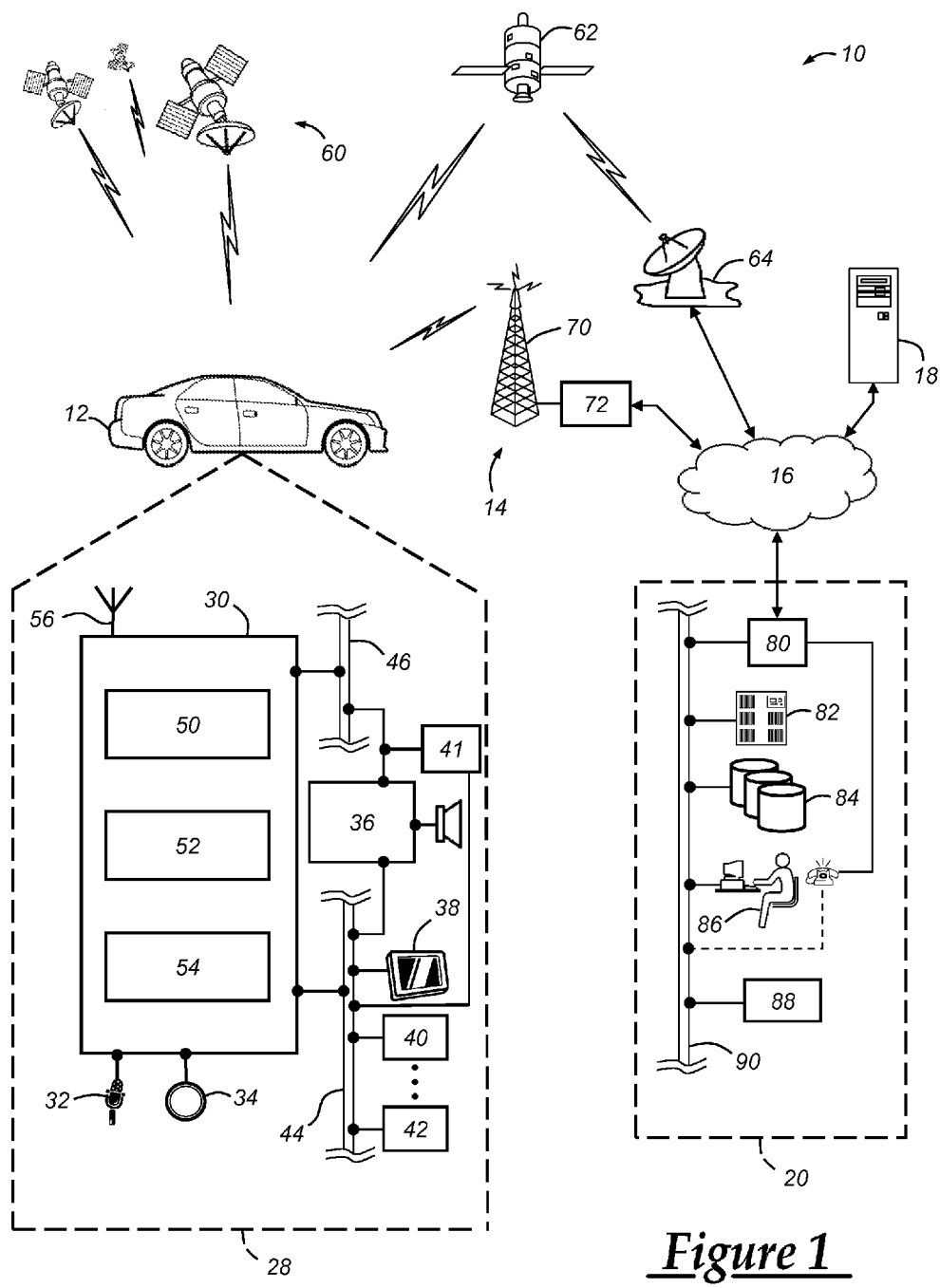
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

A central gateway module (CGM) 41 can control message permission(s) for any of the vehicle electronics 28 to receive information or messages via the vehicle bus 44 or the entertainment bus 46. Elements that make up the vehicle electronics 28 can each use one or more ECUs that can be represented by ECU identities. Every ECU identity can be associated with one or more message permissions that define which messages the ECU is allowed or intended to receive over the vehicle bus 44 or the entertainment bus 46. The CGM 41 can be implemented using a microprocessor that is in communication with and writes data to a non-volatile memory device. The memory device of the CGM 41 can store one or more ECU identities each of which can be associated with an ECU used by one of the vehicle electronics 28. The CGM 41 may receive computer-readable instructions from a back office facility, such as computer 18, or from a call center 20 that directs the CGM 41 to change one or more permissions associated with an ECU identity. Using an application programming interface (API) stored at the CGM 41 or other similar software package, the CGM 41 can implement individualized message permissions at each ECU that can be remotely updated.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
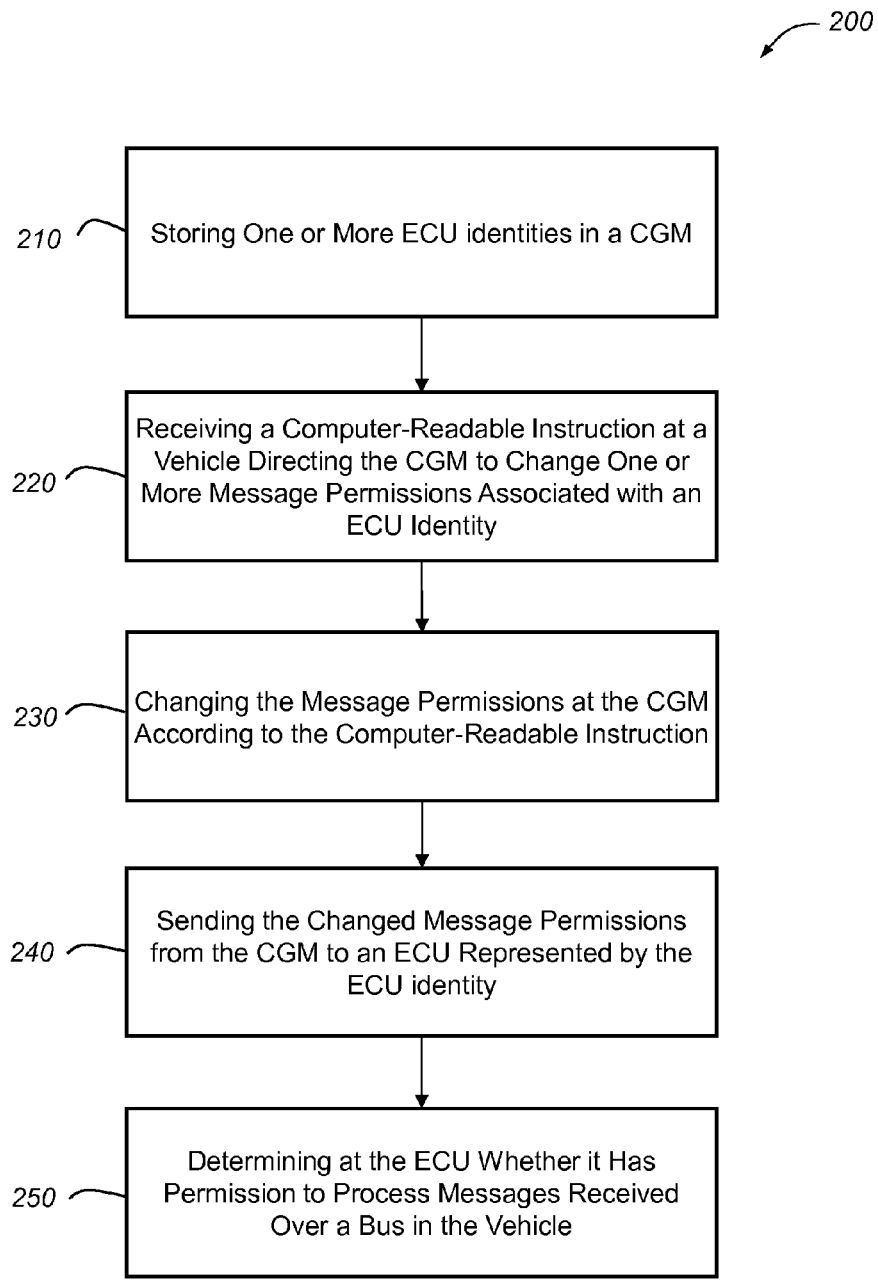
FIG. 2 is a flow chart depicting an embodiment of a method of dynamically controlling access at a vehicle to information communicated over a vehicle bus.

Turning now to FIG. 2, there is shown an embodiment of a method 200 of dynamically controlling access at the vehicle 12 to information communicated over a vehicle bus. The method 200 begins at step 210 by storing one or more electronic control unit (ECU) identities in the central gateway module (CGM) 41 that is communicatively linked with the vehicle bus 44, the entertainment bus 46, or both. One or more message permissions for receiving data via the vehicle bus 44 or the entertainment bus 46 are associated with an ECU identity in the CGM 41 that represents an ECU communicatively linked with the vehicle bus 44 or entertainment bus 46. In general, it is impractical for an ECU communicating data or messages over the vehicle bus 44 or the entertainment bus 46 to receive or process each message that is communicated over the busses. As a result, individual ECUs can be directed to receive or respond to certain messages that pertain to each ECU. An ECU communicating data or messages via the vehicle bus 44 or the entertainment bus 46 can subscribe to a subset of the messages communicated over the bus(ses).

In one example, a VSM 42 in the form of a body control module can include an ECU responsible for activating exterior lights on the vehicle 12. The body control module ECU can be associated with a body control module ECU identifier and stored in the CGM 41. If the body control module uses only one ECU, then that ECU can be called the body control module ECU identifier. However, it is possible that the body control module uses a plurality of ECUs. In that case, a plurality of ECU identifiers can be used to represent each ECU at the body control module. Generally, ECUs include a processor, a memory device, and a peripheral but electrical elements of the ECUs could be added or subtracted without affecting the method 200. Using the example above in which an ECU of the body control module controls exterior lights of the vehicle 12, the body control module ECU identifier could be associated with a message permission to only receive or process messages pertaining to activating or deactivating exterior lights.

This can be implemented by headers used in messages sent over the vehicle bus 44 or the entertainment bus 46. A header could include a code or address in the form of a logical code or address through which the ECU could identify one message sent over the vehicle bus 44 or the entertainment bus 46 from other messages. The code can identify not only the content of the message payload but also identify which bus was used to communicate the message. In one implementation, the address can be four bits in length and comprise binary or hexidecimal code. When the ECU detects a message sent over the vehicle bus 44 or the entertainment bus 46, the ECU can read the header to identify the code included with the header. The identified code of a received message can then be compared with codes stored at the ECU that correlate to messages the ECU is permitted to process. When the code included in the header of a received message matches a code stored at the ECU, then the ECU processes the message; otherwise the ECU ignores the message. The logical code can include a start byte and message length to receive as well as a rate at which the message can be received. The method 200 proceeds to step 220.

At step 220, a computer-readable instruction is received at the vehicle 12 directing the CGM 41 to change one or more message permissions associated with an ECU identity. A central facility, such as a back office or the call center 20, can decide to change the message permissions for one or more ECU identities in the CGM 41 of a particular vehicle 12. The central facility can determine the identity of the vehicle 12 using a vehicle identifier, such as a vehicle identification number (VIN), a mobile dialed number (MDN), or an international mobile subscriber identity (IMSI), and create a computer-readable instruction identifying the ECU identifier and the message permissions that should be changed for the ECU identifier. In one example, all of the message permissions for a particular ECU identifier can be replaced with a set of message permissions sent from the central facility.

Alternatively, the central facility can send an instruction that includes the ECU identifier and identifies a message permission to be added to or subtracted from existing message permissions stored with the ECU identifier in the CGM 41. Using the identity of the vehicle 12, the central facility can wirelessly transmit the computer-readable instruction from the central facility to the vehicle 12. In one implementation, the vehicle 12 can receive the computer-readable instruction at the vehicle telematics unit 30 via the cell tower 70 of the wireless carrier system 14. The method 200 proceeds to step 230.

At step 230, the message permissions are changed at the CGM 41 according to the computer-readable instruction wirelessly transmitted from the central facility. The computer-readable instruction is received at the vehicle telematics unit 30, which can communicate the instruction to the CGM 41 over the vehicle bus 44. The CGM 41 can use its processing capability to read the instruction and identify the ECU identities included in the instruction. The CGM 41 can then change the message permissions associated with the ECU identities read from the instruction in the memory device of the CGM 41. The method proceeds to step 240.

At step 240, the message permissions are sent over the vehicle bus 44 or the entertainment bus 46 from the CGM 41 to an ECU represented by the ECU identity to receive messages according to the changed message permissions. Once the CGM 41 has changed message permissions associated with an ECU identity in its memory, the CGM 41 can instruct the ECU represented by the ECU identity with the changed message permissions. For instance, if the computer-readable instruction received at the vehicle 12 directed a body control module ECU identifier to have message permissions that included not only activating or deactivating vehicle lights but also locking or unlocking doors, the CGM 41 can transmit the updated message permissions to the ECU of the body control module where the changed message permissions can be stored in a memory device of the ECU. In one example, the message permissions originally stored at the ECU of the body control module may have been represented by a binary code of "0101." That code, when included in a header of a message received over a bus in the vehicle 12, may indicate that the message pertains to activating or deactivating exterior vehicle lights. However, the message permissions of the body control module ECU can be changed to not only include the "0101" code but also include another, different code that when included in the header of a message received over a bus in the vehicle 12 permitted the body control module ECU to process messages relating to locking or unlocking vehicle doors. For example, the code for this additional permission could be "0100." That way the changed permissions at the ECU allow it to not only process messages for activating or deactivating exterior vehicle lights but also messages relating to locking or unlocking vehicle doors. In this example, messages received by the body control module that do not include the codes "0101" or "0100" in their headers may be ignored.

The CGM 41 can also instruct the ECU to maintain the changed permissions for a limited amount of time. In one example, the CGM 41 can instruct the ECU represented by the ECU identifier having changed permissions to initiate a counter used by the ECU to count a particular range of values the occurrence of which corresponds to an amount of time the message permissions should remain valid. The CGM 41 can have the ECU ignore the changed message permissions after the counter of the ECU reaches a particular value. The method 200 proceeds to step 250.

At step 250, the ECU determines whether it has permission to process messages received over the vehicle bus 44 or the entertainment bus 46 and processes or ignores the messages based on the changed permissions associated with its ECU identity. ECUs in the vehicle 12 can receive a number of messages over the vehicle bus 44 or the entertainment bus 46. When the ECU receives a message, the ECU can read a header of the message and identify any codes included in that header. The identified codes can be compared with codes that represent permissions stored at the ECUs. When the identified code(s) match the stored codes, the ECU can process the message. On the other hand, if the identified codes do not match the stored codes, the ECU can ignore the message. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of dynamically controlling access at a vehicle to information communicated over a vehicle bus, comprising the steps of:
    (a) storing one or more electronic control unit (ECU) identities in a central gateway module (CGM) that is communicatively linked with a vehicle bus;
    (b) associating one or more message permissions for receiving messages via the vehicle bus with one of the ECU identities in the CGM that represents an ECU communicatively linked with the vehicle bus, wherein the ECU identities, the message permissions, or both are dynamically configured based on instructions received from outside of the vehicle;
    (c) communicating the one or more message permissions to the ECU via the vehicle bus;
    (d) processing or ignoring messages received at the ECU via the vehicle bus according to the message permission(s);
    (e) wirelessly receiving, at a vehicle telematics unit, from a location outside of the vehicle, a computer-readable instruction directing the CGM to change one or more message permissions associated with the ECU identity;
    (f) storing the changed message permissions in the CGM;
    (g) communicating the change(s) in message permissions to the ECU via the vehicle bus; and
    (h) processing or ignoring messages received at the ECU according to the change(s) in message permissions.

2. The method of claim 1, further comprising the step of including with the changed message permissions a temporal limit.

3. The method of claim 2, wherein the temporal limit is defined by a counter of the ECU.

4. The method of claim 1, wherein the message permissions further comprise a code.

5. The method of claim 4, wherein the code is a binary or hexidecimal code.

6. The method of claim 1, further comprising the steps of: receiving a message at the ECU; comparing the changed message permissions with content from a header of the received message; and processing or ignoring the message based on the comparison.

7. A method of controlling access at a vehicle to information communicated over a vehicle bus, comprising the steps of:
(a) wirelessly receiving, at a vehicle telematics unit, from a central facility, a computer-readable instruction to change one or more message permissions associated with an electronic control unit (ECU) identity stored at the vehicle in a central gateway module (CGM) that is communicatively linked with a vehicle bus;
(b) changing the message permissions at the CGM in response to the computer-readable instruction;
(c) sending the changed message permissions over the vehicle bus from the CGM to an ECU represented by the ECU identity;
(d) determining at the ECU whether it has permission to process messages received over the vehicle bus; and
(e) processing or ignoring the messages at the ECU based on the changed permissions associated with the ECU identity.

8. The method of claim 7, further comprising the step of including with the changed message permissions a temporal limit.

9. The method of claim 8, wherein the temporal limit is defined by a counter of the ECU.

10. The method of claim 7, wherein the message permissions further comprise a code.

11. The method of claim 10, wherein the code is a binary or hexidecimal code.

* * * * *